INVENTORS
NORMAN O. KRENKE
EUGENE D. SWENSON

BY Learman, Learman, & McCulloch

ATTORNEYS

April 17, 1962 N. O. KRENKE ET AL 3,030,153
PNEUMATIC CONVEYOR SYSTEM
Filed June 1, 1959 3 Sheets-Sheet 2

INVENTORS
NORMAN O. KRENKE
EUGENE D. SWENSON

ATTORNEYS

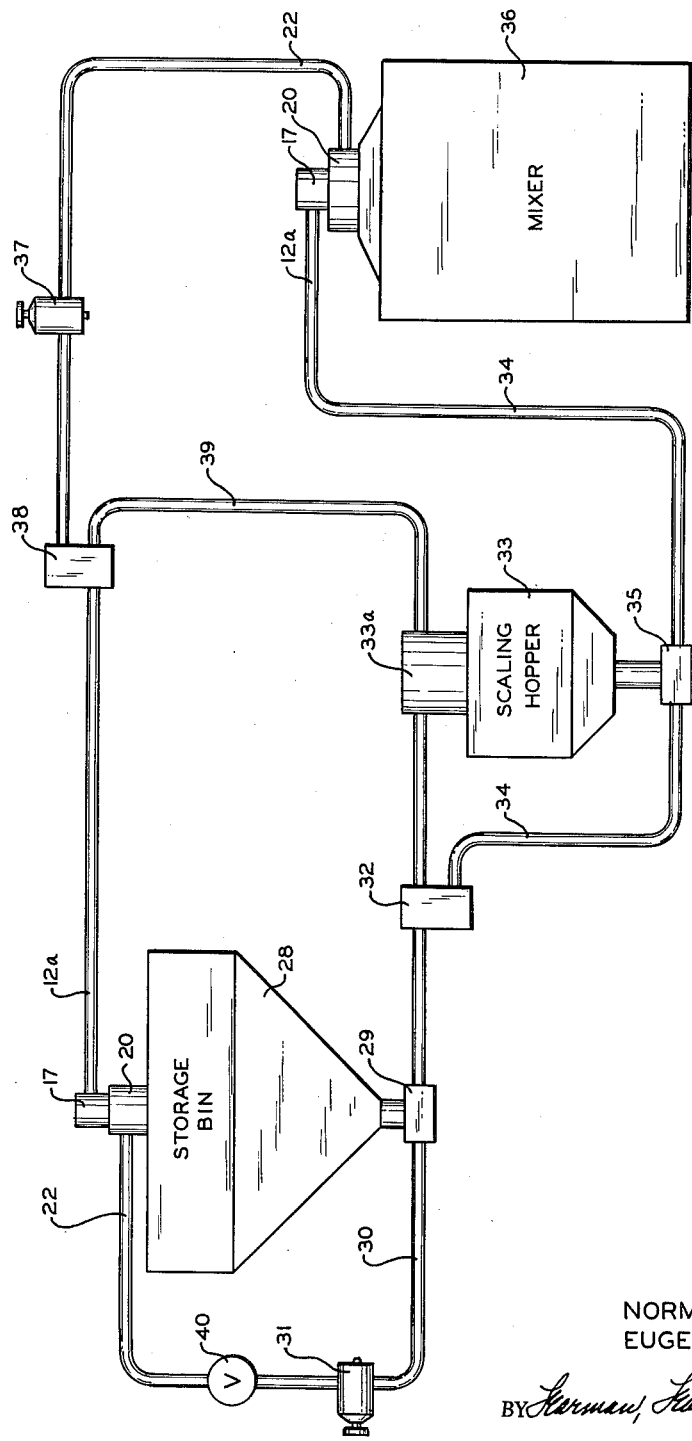

3,030,153
PNEUMATIC CONVEYOR SYSTEM
Norman O. Krenke and Eugene D. Swenson, Saginaw, Mich., assignors to Baker Perkins Inc., Saginaw, Mich., a corporation of New York
Filed June 1, 1959, Ser. No. 817,321
6 Claims. (Cl. 302—17)

This invention relates to pneumatic conveying systems of the type wherein flour or another similar product is conveyed by an air stream from a place of storage to a dough mixing machine or like destination in a processing line where the product is to be used. More particularly the present invention relates to improvements in what may be termed "closed loop" conveying systems in which the air stream is returned to the storage bin or the like for the separation of any material not separated out at the destination, and, in the instant case, for the reuse of the same air as the conveying medium.

In present day pneumatic flour conveying systems such as described in the Riordan Patent 2,688,517 and the Krenke Patent 2,688,518, difficulty is encountered with periodic clogging of the filters which must be employed to dissipate the air stream once it has been returned to the storage bin, because the separation of the flour from the conveying air stream has not heretofore been as effective as is desirable. Such systems must be shut down at regular intervals so that the filters can be removed, cleaned, and replaced or in some installations so the filters can be subjected to reverse air cleaning action. Further, the provision of such filters in effect opens the storage bin to dust and possible infestation by insects.

It is one of the principal objects of the present invention to provide a system of the character described in which there are no filters in the storage bin or the like for the purpose of releasing the air stream and the air stream is returned to the circulating mechanism.

A further object of the invention is to provide a system in which there is a virtually complete separation of the flour from the air stream, at points where such is desired, in a highly efficient and reliable manner.

Another object of the invention is to provide a novel method of separating the entrained flour or other material from the conveying air stream which obviates the necessity for the constant and costly maintenance which filters and the like require.

Another object of the invention is to provide a system which does not have a dusty atmosphere at the point where the product reaches its destination.

With the above and other objects in view, the present invention consists in the combination and arrangement of parts hereinafter more fully described, illustrated in the accompanying drawings, and more particularly pointed out in the appended claims, it being understood that equivalent changes may be made in the various elements which comprise the invention without departing from the spirit therof or the scope of the appended claims.

In the drawings,

FIGURE 4 is a schematic view illustrating another embodiment of the invention.

Figure 1:
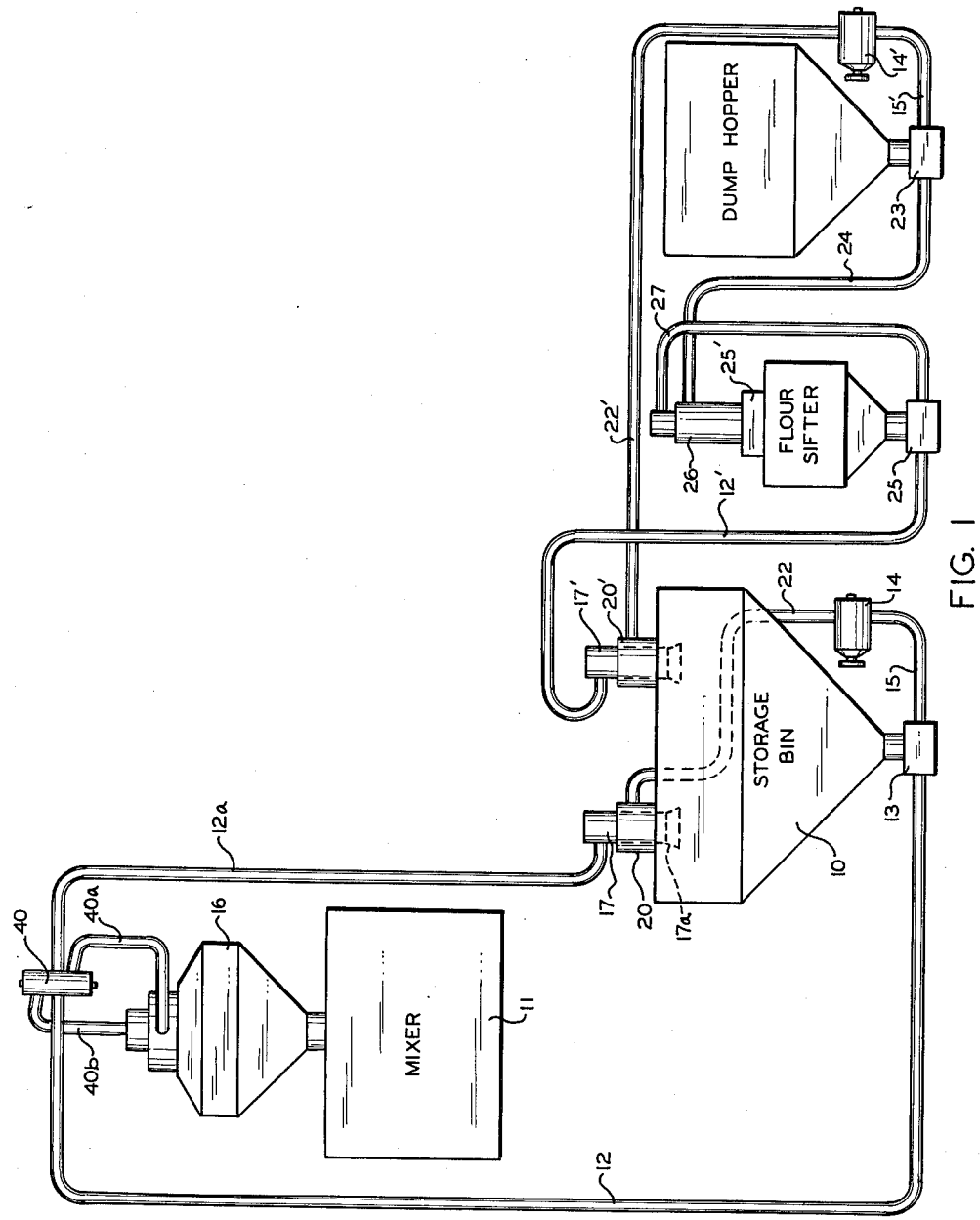
FIGURE 1 is a schematic view illustrating a system in accordance with the invention.

Referring now more particularly to the accompanying drawings, in which I have shown preferred embodiments of the invention only, a numeral 10 in FIGURE 1 illustrates a storage bin for storing flour which is to be intermittently conveyed to a dough mixer 11 through a conduit or line 12. Communicating with the bin 10 is a paddle wheel type feeder 13 for feeding flour from the storage bin 10 into an air stream which is created by a suitable blower unit 14. Any suitable motor driven feeder may be employed and one which is suitable for the purpose is disclosed in Colburn Patent No. 2,550,781. The blower 14 may be a positive displacement compressor or blower of the Root's type which is capable of delivering an air stream at a velocity of 4000–5000 feet per minute through the conduit 15 connecting the blower 14 and feeder 13.

Figure 3:
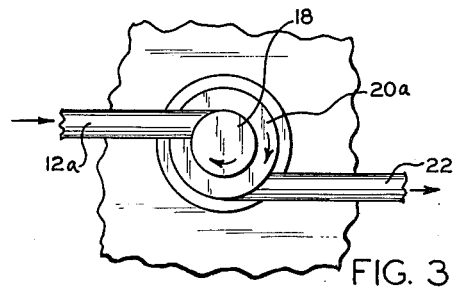
FIGURE 3 is a top plan view of the structure shown in FIGURE 2.
Figure 2:
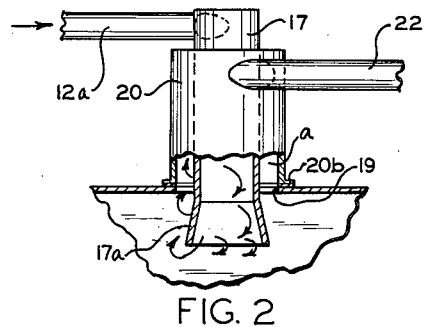
FIGURE 2 is an enlarged, partly sectional, elevational view illustrating separation means which permits reuse of the air stream.

The mixer 11 has a unit mounted on top thereof which includes a flour scale hopper 16 and employs a valve 40 of the type shown in FIGURES 2 and 3 of Krenke Patent 2,688,518 which either delivers flour to the mixer or bypasses the mixer so that the flour laden air stream simply proceeds back through a return section 12a of line 12 to the storage bin 10. The line 40a is the charge conduit referred to in the aforementioned Krenke patent and the line 40b is the discharge conduit.

Return line 12a leads tangentially into the upper end of a tube 17, and the flour laden air stream spirals or whirls downwardly in tube 17 at a high velocity as indicated by the arrows in FIGURE 2. The upper end of tube 17 is closed by a plate 18 and the lower end of tube 17 depends through an enlarged opening 19 in the top wall of the bin and down into the bin as shown. It will be noted that, not only does the tube 17 extend down into the bin 10, but it is also provided with a flaring portion 17a as shown. An outer tube 20, having a top wall 20a supporting the inner tube 17, is fixed to the upper wall of the storage bin 10, the outer tube 20 having a flange 20b which is bolted to the storage bin 10 to provide a tight connection with the top wall of the bin. A gasket or seal may be employed to insure a leak proof connection in any suitable manner.

From the outer tube 20 a line or conduit 22 leads off tangentially in a direction such that air spiralling downward in the tube 17 in one direction of rotation, and thence spiralling upwardly in the same direction of rotation after leaving the flaring portion 17a of tube 17, is forced to change its direction in order to proceed out line 22 back to blower 14.

Most of the flour separates out from the air stream as it revolves at a high rate of speed down tube 17, the flour collecting as a mass on the interior wall of the tube and discharging by gravity to the bin 10. Once the air stream leaves the coniform portion 17a, which assists the separation, and enters the enlarged area of the bin, its velocity decreases considerably. At this point it is forced to change axial direction in order to pass upwardly in the channel or annular space "a" between walls 17 and 20 and the required reversal of direction results in the separation of additional flour from the air stream. The air proceeding upwardly at an additionally reduced rate will be revolving in the same direction of rotation as when it left tube 17. However, as it approaches the outlet conduit 22 it is required to reverse its direction of rotation. This occurs somewhere in the space "a" near the conduit 22 and, at the point of reversal, the air stream virtually stops and for practical purposes all of the remaining flour falls out at this point and is discharged by gravity down the interior wall of the outer separator surface 20. The air proceeding in line 22 to the blower 14 for recirculation through the system as needed will be substantially flour free and will not adversely affect the operation of the blower.

A very similar system is used to supply flour to the storage bin and for the sake of convenience like parts have been given similar numerals. The blower 14' supplies an air stream to a dump hopper through a line 15', the hopper having a feeder 23 of the same construction as feeder 13 which has an outlet line 24 leading to a flour sifter having another feeder 25 of the same construction. Line 24 leads to a separator 26 which separates flour from the air stream and permits it to proceed through a conventional feeder 25' to the flour sifter, the air stream being fed by a line 27 to the feeder 25 so that it receives the flour once again after it has been processed through the sifter. The outlet line 12' from the sifter leads to a tube 17' supported in the same manner by a tube 20' of larger diameter which has an outlet line 22' returning to blower 14'. The separator unit 17'—20' operates in exactly the same manner as the separator unit 17—20 previously described and the air returned to blower 14' is, for practical purposes, free of entrained flour.

In FIGURE 4 a system is illustrated in which both a blower fan and a suction fan are used in the system. In this embodiment of the invention storage bin 28 has a feeder valve 29 communicating with a conduit 30 serviced by blower fan 31. The conventional diverter valve 32 may deliver the air stream with entrained flour from the storage bin to the upper end of a scaling hopper 33 which has a separator portion or filling valve 33a, or can deliver to a conduit 34 leading through feeder 35 which delivers scaled flour to the line 34. The line 34 delivers the flour to a mixer 36 or other machine which has a separator unit 17—20 of exactly the same type described in applicant's FIGURES 2 and 3. The line portion leading into the central tube 17 is accordingly for the sake of convenience designated 12a and the line section leading therefrom is designated 22. No scaling hopper is needed at the upper end of the mixer in this embodiment of the invention because the system 17—20 so thoroughly separates the flour which has already been weighed by the scaling hopper 33. Further, a thorough separation occurs at the mixer which prevents the dusting of the atmosphere around the mixer due to air with entrained particles escaping from the mixer. To aid the separation, a suction fan 37 is employed in the return line 22 which leads to a conventional diverter valve 38. Valve 38 delivers the air from either of the lines 22 or 39 to the line section 12a which feeds the system 12—20 which is again provided at the upper end of the storage bin 28.

It will be noted that the air separated out of the storage bin proceeds again to blower 31 and a bleed valve 40 of a suitable nature can be employed downstream of the blower 31 if desired to regulate the volume of air in the system. This is desirable because both blower fan 31 and suction fan 37 have provision for balancing the amount of air in the system, to compensate for the fact that air may be lost or gained during conveying. It is to be understood that where we have referred to units 17—20 which are in the system of FIGURE 4 both at the upper end of the storage bin and at the mixer or unit to which the flour is delivered we refer to the entire structure shown in FIGURES 2 and 3.

It should be apparent that we have perfected a considerably improved pneumatic conveying system which differs in important respects from systems presently in use. It is to be understood that we contemplate that various changes or substitutions may be made for the various parts which comprise the invention to achieve similar results, without departing from the spirit of the invention or the scope of the appended claims.

We claim:

1. In a fluid conveying system; means for feeding particulate material into a fluid stream; first conduit means for transmitting particulate material entrained in said stream; means for moving said stream with the material therein through said first conduit means to a destination; a first enlarged tube relative to said first conduit means into which said first conduit means extends generally tangentially; a second tube surrounding at least a part of said first tube and of sufficiently greater girth to form an annular passage between said tubes; said first tube having an opening leading to said passage downstream of said communication of the said first conduit means with the first tube, second conduit means communicating with said second tube leading said stream from said passage at a point between said first conduit means and said opening and causing the direction of axial travel of said stream to be reversed in said passage from its axial travel in said first tube; and means enclosing said tubes for collecting the material removed from said stream; said first and second tubes being open to said means enclosing said tubes.

2. The combination defined in claim 1 in which said second conduit means is of less diameter than said second tube and leads generally tangentially from said second tube.

3. The combination defined in claim 2 in which said stream is moved in an opposite direction of rotation in said first tube and passage from the direction of rotation it would take to naturally enter said second conduit means as it follows a spiralling path.

4. In a pneumatic conveying system; means for creating an air stream having velocity; means for entraining particulate material in said air stream as said air stream moves toward a destination; first conduit means for said air stream; a first depending tube of larger diameter than said first conduit means into which said first conduit means leads generally tangentially, having an open bottom end; and outer depending tube surrounding the lower end of said first tube and open at its lower end; a collecting housing enclosing the lower end of the outer tube; and conduit means of substantially less diameter than said outer tube extending generally tangentially from the upper end of the outer tube; said conduit means extending tangentially from said outer tube at a location in which its direction of extent is opposite to the direction of rotation which the air stream is caused to take by said first conduit means.

5. In a pneumatic conveying system; a blower; conduit means leading from said blower; means for entraining flour or the like in the air stream created by the blower interposed in said conduit means; a first vertically disposed tube of larger diameter than said conduit means into which said conduit means leads normally and generally tangentially to the longitudinal extent of the tube, having an open lower end; an outer, vertically disposed tube surrounding said first tube and concentrically spaced therefrom to provide an annular passage therebetween, said outer tube also being open at its lower end; a bin receiving the outer tube and having a sealed connection therewith; conduit means of substantially less diamter than said outer tube extending generally tangentially normally from the upper end of the outer tube in a diametrically opposed direction relative to said first conduit means and leading from the side of said outer tube remote from the side of the first tube into which said first mentioned conduit means leads, said last mentioned conduit means leading back to said blower; and said inner tube extending a substantial distance into said bin and a portion thereof within said bin tapering outwardly toward its lower end.

6. The combination defined in claim 1 in which said first tube depends a substantial distance axially into said means enclosing said tubes for collecting the material removed from said stream.

References Cited in the file of this patent
UNITED STATES PATENTS

| 2,010,231 | Heist | Aug. 6, 1935 |
| 2,572,862 | Israel | Oct. 30, 1951 |
| 2,688,517 | Riordan | Sept. 7, 1954 |
| 2,688,518 | Krenke | Sept. 7, 1954 |
| 2,810,609 | Temple | Oct. 22, 1957 |
| 2,895,768 | Bray | July 21, 1959 |